United States Patent
Kominsky

(10) Patent No.: US 8,829,825 B2
(45) Date of Patent: Sep. 9, 2014

(54) ACTIVE RECTIFIER FOR VEHICLES

(75) Inventor: Richard A. Kominsky, Westfield, MA (US)

(73) Assignee: Exelis Inc., McLean, VA (US)

( * ) Notice: Subject to any disclaimer, the term of this patent is extended or adjusted under 35 U.S.C. 154(b) by 717 days.

(21) Appl. No.: 13/084,892

(22) Filed: Apr. 12, 2011

(65) Prior Publication Data

US 2012/0262962 A1  Oct. 18, 2012

(51) Int. Cl.
*H02P 25/30*  (2006.01)
*H02M 7/217*  (2006.01)

(52) U.S. Cl.
CPC .................................... *H02M 7/217* (2013.01)
USPC ......... 318/148; 318/140; 318/159; 318/400.3

(58) Field of Classification Search
USPC ............ 318/140, 148, 159, 400.3; 363/21.06, 363/37, 44, 48, 152, 153
See application file for complete search history.

(56) References Cited

U.S. PATENT DOCUMENTS

| | | | | |
|---|---|---|---|---|
| 3,418,528 A * | 12/1968 | Watanabe et al. | ............. | 361/240 |
| 3,452,268 A * | 6/1969 | Grossoehme | .................... | 363/91 |
| 3,633,090 A * | 1/1972 | Hill | ............................. | 320/123 |
| 3,757,198 A * | 9/1973 | Hill | ............................. | 322/28 |
| 5,172,046 A * | 12/1992 | Dittner et al. | .................... | 322/89 |
| 5,955,910 A * | 9/1999 | Levin et al. | .................... | 327/393 |
| 6,330,169 B2 * | 12/2001 | Mullett et al. | .................. | 363/16 |
| 6,420,842 B1 * | 7/2002 | Gold | ............................. | 318/141 |
| 8,203,372 B2 * | 6/2012 | Arduini | ........................ | 327/280 |
| 2009/0261790 A1 * | 10/2009 | Arduini | ........................ | 323/266 |

OTHER PUBLICATIONS

Texas Instruments, GREEN Rectifier Controller Device, Check for Samples: UCC24610, SLUSA87B—Aug. 2010—Revised Sep. 2010, 34 pages.

* cited by examiner

*Primary Examiner* — Bentsu Ro
*Assistant Examiner* — Thai Dinh
(74) *Attorney, Agent, or Firm* — Cantor Colburn LLP

(57) ABSTRACT

A vehicle power system including an unregulated alternator; a saturable reactor receiving an output AC voltage from the alternator and generating a reduced AC voltage in response to a bias signal; and an active rectifier rectifying the reduced AC voltage to a DC voltage.

13 Claims, 2 Drawing Sheets

ACTIVE RECTIFIER FOR VEHICLES

BACKGROUND OF THE INVENTION

Rectifiers are used in a myriad of electronic devices to convert alternating current to direct current. Active rectification (also referred to as synchronous rectification) employs MOSFETs to instead of diodes in each branch of a rectifier bridge. MOSFETs are used to eliminate the high voltage drop and power consumption experienced with conventional diode rectifiers. Improvements in MOSFET-based active rectifiers would be well received in the art.

BRIEF SUMMARY OF THE INVENTION

An exemplary embodiment of the invention is a vehicle power system including an unregulated alternator; a saturable reactor receiving an output AC voltage from the alternator and generating a reduced AC voltage in response to a bias signal; and an active rectifier rectifying the reduced AC voltage to a DC voltage.

Another exemplary embodiment of the invention is a vehicle power system including an unregulated alternator; a saturable reactor receiving an output AC voltage from the alternator and generating a reduced AC voltage in response to a bias signal; and an active rectifier rectifying the reduced AC voltage to a 28 volt DC voltage; wherein the active rectifier includes a transistor receiving the reduced AC voltage; a comparator measuring voltage across the transistor; and a driver coupled to the comparator, the driver turning the transistor on and off in response to a control signal from the comparator, the driver generating a drive signal, the drive signal applied to a gate terminal of the transistor; wherein the transistor includes a source terminal coupled to an inverting input of the comparator, the comparator includes a hysteresis resistor between a comparator output terminal and a comparator non-inverting input; wherein the driver is coupled to a gate of the transistor through a drive resistor, the drive resistor and capacitance of the transistor form an RC network to filter jitter from the drive signal, the drive resistor has a value of about 2 kohms; wherein the comparator generates a turn-on control signal when the forward bias voltage of the transistor is at a turn-on threshold and the comparator generates a turn-off control signal when the forward bias voltage of the transistor is at a turn-off threshold, the turn-off threshold being a positive, non-zero value, the turn-on threshold is about 75 millivolts where a source of the transistor is more positive than a drain of the transistor and the turn-off threshold is about 25 millivolts where the source of the transistor is more positive than the drain of the transistor.

DETAILED DESCRIPTION

Figure 1:
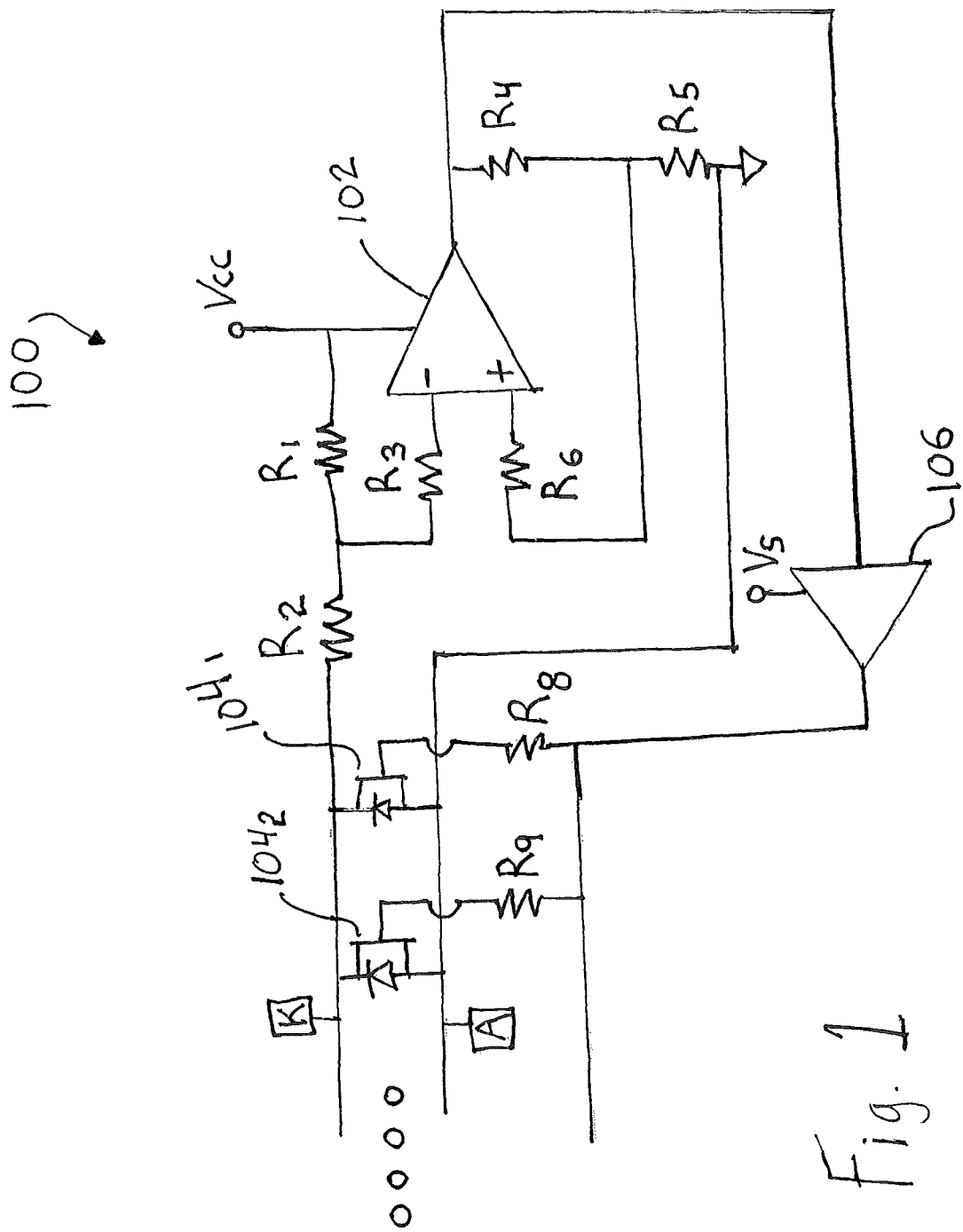
FIG. 1 is a circuit diagram of an active rectifier circuit for replacing a diode in a conventional diode bridge rectifier.

FIG. 1 is a circuit diagram of an active rectifier circuit for replacing a diode in a conventional diode bridge rectifier. The circuit of FIG. 1 would replace each diode, so in a four diode rectifier bridge, four circuits of FIG. 1 would be employed. The circuit 100 includes a comparator 102 coupled to a power source Vcc (e.g., 5 volts). The inverting input of comparator 102 is coupled to the source terminals of the transistors 104, through resistors R2 and R3 and to VCC through resistors R1 and R3. In exemplary embodiments, R1 is 5 kohms, R2 is 75 ohms and R3 is 30 kohms. Two transistors $104_1$ and $104_2$ (e.g. MOSFETs) are shown in parallel in FIG. 1. Multiple transistors 104 are used for higher power requirements. By paralleling the transistors 104, the effective resistance of the transistors is reduced, thereby reducing power drop over the circuit. More than two transistors 104 may be used, depending on power requirements. The drain terminals of transistors 104 are coupled to a floating circuit ground. The gate terminals of transistors 104 are coupled to a driver 106 through drive resistors R8 and R9. Driver 106 is powered by voltage Vs (e.g., 15 volts). A single driver 106 is shown, but in alternate embodiments each transistor 104 has it's own driver. The voltage source signal to be rectified is applied at points A and K over the drain and source terminals of transistors 104.

Comparator 102 monitors the forward voltage on transistors $104_1$ and $104_2$ and determines whether to turn the transistors 104 on or off based on the forward voltage. The on-off conditions for transistors 104 are described in further detail herein. When the forward bias over the transistors 104 reaches a turn-on threshold, comparator 102 sends a turn-on control signal (e.g., 5 volts) to driver 106, which generates a drive signal to the gate terminals of transistors 104 to turn the transistors 104 on. In an exemplary embodiment, the turn-on threshold is about 75 millivolts of forward bias, where the source terminal of transistor 104 is more positive than the drain terminal of transistor 104.

Once the transistors 104 are on, the comparator 102 maintains transistors 104 in the on state, until a turn-off threshold is reached. In an exemplary embodiment, the turn-off voltage is about 25 millivolts of forward bias, where the source of the transistor is more positive than the drain of the transistor. When the turn-off threshold is reached, the comparator output signal changes states to a turn-off control signal (e.g., 0 volts) and driver 106 turns the transistors off. The turn-off threshold is selected to be positive and above zero volts to prevent reverse current through the transistors 104. This means that the transistors 104 turn off when there is forward current flowing in the transistors. If the comparator 102 waited until there was a detectable amount of reverse bias across the transistors 104, substantial reverse current would be flowing in the transistors, which is to be avoided.

Circuit 100 is designed to provide smooth switching between the on and off states using multiple elements. The output of the comparator 102 includes hysteresis resistors R4, R5 and R6. In exemplary embodiments, R4 is 5 kohms, R5 is 50 ohms and R6 is 30 kohms. The hysteresis resistors provide for a more clean transition of comparator 102 output signal when transitioning from on to off states and transitioning from off to on states.

Further, driver 106 is coupled to the gate terminals of transistors 104 through gate drive resistors R8 and R9. The value for gate drive resistors R8 and R9 is selected to prevent the transistors 104 from toggling on and off improperly. For example, once the forward voltage over transistors 104 reaches 75 millivolts, the transistors 104 are turned on by driver 106. Upon initial turn-on of the transistors 104, the forward bias voltage may drop to below the Vgs turn-on voltage of the transistors, causing the transistors 104 to turn off, which increases the forward bias voltage, thereby causing the transistors 104 to turn on. Transistors 104 toggling on and off is disruptive to stable operation of the circuit. In exemplary embodiments, the gate drive resistors are about 2 kohms. The 2 kohm gate drive resistors, along with the transistor gate and miller capacitance, forms an RC network that filters out the rapid on-off signal jitter and regulates the gate voltage to a fairly constant voltage roughly equivalent to the gate on threshold voltage.

Figure 2:
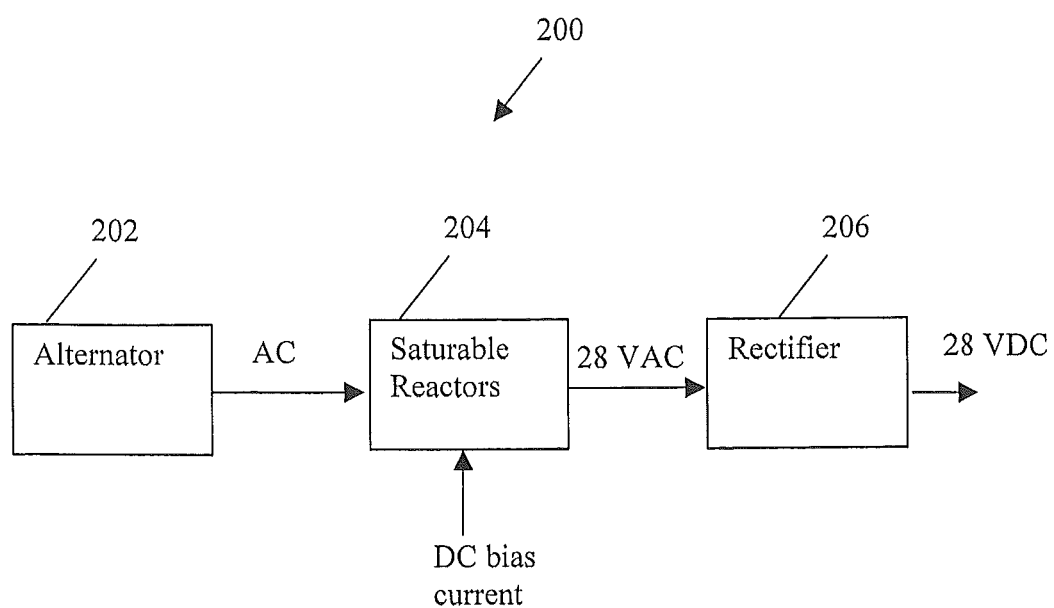
FIG. 2 is a system diagram of an active rectifier in a vehicle power system.

FIG. 2 is a block diagram of a vehicle power system 200 in embodiments of the invention. System 200 includes a vehicle alternator 202 that generates an AC output voltage. Alternator 202 is unregulated and may generate AC voltage of 200 volts. The output of the alternator 202 is provided to a saturable reactor 204. Saturable reactor 204 reduces the input voltage from alternator 202 to a reduced AC output voltage, in response to a DC bias signal. In exemplary embodiments, the DC bias signal applied to saturable reactor 204 is controlled to generate 28 volts AC at the output of the saturable reactor 204. The output of the saturable reactor 204 is applied to rectifier 206. Rectifier 206 is constructed using multiple circuits 100 of FIG. 1 to rectify the 28 VAC to 28 VDC.

While the invention has been described with reference to exemplary embodiments, it will be understood by those skilled in the art that various changes may be made and equivalents may be substituted for elements thereof without departing from the essential scope thereof. Therefore, it is intended that the invention not be limited to the particular embodiments disclosed for carrying out the invention, but that the invention will include all embodiments falling within the scope of the appended claims.

What is claimed is:

1. A vehicle power system comprising:
an unregulated alternator;
a saturable reactor receiving an output AC voltage from the alternator and generating a reduced AC voltage in response to a bias signal; and
an active rectifier rectifying the reduced AC voltage to a DC voltage;
wherein the active rectifier includes a circuit including:
a transistor receiving the reduced AC voltage;
a comparator for comparing a first voltage at a first terminal of the transistor to a second voltage at a second terminal of the transistor;
and a driver coupled to the comparator, the driver turning the transistor on and off in response to a control signal from the comparator;
wherein the transistor includes a source terminal coupled to an inverting input of the comparator;
the comparator includes a hysteresis resistor between a comparator output terminal and a comparator non-inverting input.

2. The vehicle power system of claim 1 wherein the DC voltage is 28 volts.

3. The vehicle power system of claim 1 wherein:
the driver generates a drive signal, the drive signal applied to a gate terminal of the transistor.

4. The vehicle power system of claim 3 wherein:
the driver is coupled to the gate terminal of the transistor through a drive resistor.

5. The vehicle power system of claim 4 wherein:
the drive resistor and capacitance of the transistor form an RC network to filter jitter from the drive signal.

6. The vehicle power system of claim 5 wherein:
the drive resistor has a value of about 2 kohms.

7. The vehicle power system of claim 1 further comprising:
a second transistor in parallel with the transistor, the second transistor receiving the reduced AC voltage;
the comparator comparing a first voltage at a first terminal of the second transistor to a second voltage at a second terminal of the second transistor;
the driver turning the second transistor on and off in response to the control signal from the comparator.

8. The vehicle power system of claim 7 wherein:
the driver is coupled to a gate terminal of the second transistor through a second drive resistor.

9. The vehicle power system of claim 1 wherein:
the comparator generates a turn-on control signal when the forward bias voltage of the transistor is at a turn-on threshold and the comparator generates a turn-off control signal when the forward bias voltage of the transistor is at a turn-off threshold, the turn-off threshold being a non-zero value in which a source of the transistor is more positive than a drain of the transistor.

10. The vehicle power system of claim 9 wherein:
the turn-on threshold is about 75 millivolts where the source of the transistor is more positive than the drain of the transistor.

11. The vehicle power system of claim 9 wherein:
the turn-off threshold is about 25 millivolts where the source of the transistor is more positive than the drain of the transistor.

12. A vehicle power system comprising:
an unregulated alternator;
a saturable reactor receiving an output AC voltage from the alternator and generating a reduced AC voltage in response to a bias signal; and
an active rectifier rectifying the reduced AC voltage to a 28 volt DC voltage;
wherein the active rectifier includes a circuit including:
a transistor receiving voltage the reduced AC voltage;
a comparator for comparing a first voltage at a first terminal of the transistor to a second voltage at a second terminal of the transistor;
and a driver coupled to the comparator, the driver turning the transistor on and off in response to a control signal from the comparator, the driver generating a drive signal, the drive signal applied to a gate terminal of the transistor;
wherein the transistor includes a source terminal coupled to an inverting input of the comparator, the comparator includes a hysteresis resistor between a comparator output terminal and a comparator non-inverting input;
wherein the driver is coupled to a gate terminal of the transistor through a drive resistor, the drive resistor and capacitance of the transistor forming an RC network to filter jitter from the drive signal, the drive resistor having a value of about 2 kohms;
wherein the comparator generates a turn-on control signal when the forward bias voltage of the transistor is at a turn-on threshold and the comparator generates a turn-off control signal when the forward bias voltage of the transistor is at a turn-off threshold, the turn-off threshold being a positive, non-zero value, the turn-on threshold is about 75 millivolts where a source of the transistor is more positive than a drain of the transistor and the turn-off threshold is about 25 millivolts where the source of the transistor is more positive than the drain of the transistor.

13. The vehicle power system of claim 12 further comprising:
a second transistor in parallel with the transistor, the second transistor receiving the reduced AC voltage;
the comparator comparing a first voltage at a first terminal of the second transistor to a second voltage at a second terminal of the second transistor;
the driver turning the second transistor on and off in response to a control signal from the comparator, the driver coupled to a gate terminal of the second transistor through a second drive resistor.

* * * * *